US007237775B2

(12) United States Patent
Thomas et al.

(10) Patent No.: US 7,237,775 B2
(45) Date of Patent: Jul. 3, 2007

(54) WAGERING GAME WITH PREDETERMINED LOCATION FOR WILD-CARD FEATURE

(75) Inventors: Alfred Thomas, Las Vegas, NV (US); Dion K. Aoki, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 82 days.

(21) Appl. No.: 10/878,101

(22) Filed: Jun. 28, 2004

(65) Prior Publication Data

US 2005/0288090 A1 Dec. 29, 2005

(51) Int. Cl.
*G07F 17/34* (2006.01)
*A63F 13/00* (2006.01)

(52) U.S. Cl. .............................. 273/143 R; 273/138.2; 463/20; 463/30; 463/31

(58) Field of Classification Search ................ 273/292, 273/269, 143 R, 138.2, 138.1; 463/17–20, 463/12, 13, 30–33
See application file for complete search history.

(56) References Cited

U.S. PATENT DOCUMENTS

| | | | | |
|---|---|---|---|---|
| 5,393,057 | A * | 2/1995 | Marnell, II | 463/13 |
| 5,609,524 | A * | 3/1997 | Inoue | 463/20 |
| 6,086,066 | A * | 7/2000 | Takeuchi et al. | 273/143 R |
| 6,190,254 | B1 | 2/2001 | Bennett | 463/13 |
| 6,251,013 | B1 | 6/2001 | Bennett | 463/13 |
| 6,439,993 | B1 | 8/2002 | O'Halloran | 463/16 |
| 6,517,432 | B1 | 2/2003 | Jaffe | 463/16 |
| 6,551,187 | B1 | 4/2003 | Jaffe | 463/20 |
| 6,581,935 | B1 * | 6/2003 | Odom | 273/269 |
| 6,634,941 | B2 | 10/2003 | Olive | 463/16 |
| 6,780,109 | B2 | 8/2004 | Kaminkow | 463/20 |
| 6,805,349 | B2 | 10/2004 | Baerlocher et al. | 273/138.2 |
| 6,805,632 | B2 | 10/2004 | Suda | 463/25 |
| 6,866,583 | B2 | 3/2005 | Glavich et al. | 463/20 |
| 6,905,406 | B2 | 6/2005 | Kaminkow et al. | 463/20 |
| 6,921,335 | B2 | 7/2005 | Rodgers et al. | 463/30 |
| 2002/0039920 | A1 | 4/2002 | Bryant | 463/20 |
| 2002/0047238 | A1 | 4/2002 | Ainsworth et al. | 273/292 |
| 2002/0052233 | A1 | 5/2002 | Gauselmann | 463/20 |
| 2002/0082075 | A1 | 6/2002 | Meyer | 463/20 |
| 2003/0013517 | A1 | 1/2003 | Bennett et al. | 463/25 |
| 2003/0054874 | A1 | 3/2003 | Kaminkow | 463/20 |
| 2003/0057645 | A1 | 3/2003 | Baerlocher et al. | 273/138.2 |
| 2003/0060267 | A1 | 3/2003 | Glavich et al. | 463/20 |
| 2003/0064772 | A1 * | 4/2003 | Tempest et al. | 463/16 |
| 2003/0064779 | A1 | 4/2003 | Suda | 463/20 |
| 2003/0064802 | A1 | 4/2003 | Rodgers et al. | 463/30 |
| 2003/0069062 | A1 | 4/2003 | Shimizu | 463/20 |
| 2003/0069063 | A1 | 4/2003 | Bilyeu et al. | 463/20 |
| 2003/0125105 | A1 | 7/2003 | Bennett | 463/20 |
| 2003/0186737 | A1 | 10/2003 | Bennett et al. | 463/20 |
| 2003/0203752 | A1 | 10/2003 | Kaminkow et al. | 463/20 |
| 2003/0203753 | A1 | 10/2003 | Muir et al. | 463/20 |
| 2003/0207709 | A1 | 11/2003 | Paotrakul | 463/20 |
| 2004/0017041 | A1 * | 1/2004 | Inoue | 273/143 R |
| 2004/0033827 | A1 * | 2/2004 | Gilmore et al. | 463/20 |

(Continued)

*Primary Examiner*—Benjamin Layno
(74) *Attorney, Agent, or Firm*—Nixon Peabody LLP

(57) ABSTRACT

A method of conducting a wagering game includes selecting at least one randomly-selected outcome from a plurality of outcomes in response to receiving a wager from a player. The randomly-selected outcome is displayed in the form of an array of symbols, and a special symbol is presented in a fixed location of the array of symbols. The special symbol is independent of the array of symbols and combinable with the symbols of the plurality of reels to indicate the randomly-selected outcome.

36 Claims, 12 Drawing Sheets

U.S. PATENT DOCUMENTS

| | | | | |
|---|---|---|---|---|
| 2004/0038730 | A1 | 2/2004 | Suda | 463/20 |
| 2004/0048646 | A1 | 3/2004 | Visocnik | 463/16 |
| 2004/0048652 | A1 | 3/2004 | Ching et al. | 463/20 |
| 2004/0053676 | A1 | 3/2004 | Rodgers | 463/20 |
| 2004/0053677 | A1 | 3/2004 | Hughs-Baird | 463/20 |
| 2004/0072612 | A1 | 4/2004 | Rodgers et al. | 463/20 |
| 2004/0137982 | A1 | 7/2004 | Cuddy et al. | 463/20 |
| 2005/0020344 | A1 | 1/2005 | Kaminkow | 463/16 |
| 2005/0049035 | A1 | 3/2005 | Baerlocher et al. | 463/20 |
| 2005/0054412 | A1 | 3/2005 | Gauselmann | 463/16 |
| 2005/0064924 | A1 | 3/2005 | Glavich et al. | 463/13 |
| 2005/0101369 | A1 | 5/2005 | Meyer | 463/16 |
| 2005/0101380 | A1 | 5/2005 | Glavich et al. | 463/25 |
| 2005/0148384 | A1 | 7/2005 | Marks et al. | 463/20 |
| 2005/0164775 | A1 | 7/2005 | Rodgers et al. | 463/20 |

* cited by examiner

WAGERING GAME WITH PREDETERMINED LOCATION FOR WILD-CARD FEATURE

FIELD OF THE INVENTION

The present invention relates generally to gaming terminals for playing a wagering game and, more particularly, to a wagering game having a wild-card feature in a predetermined location.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

Some games use wild symbols, or wild cards, to enhance a player's excitement because wild symbols increase the likelihood of obtaining a winning combination. In general, a wild symbol is a symbol that can vary according to the selected combination of symbols. For example, if a winning combination in a slot machine is won by selecting three cherry symbols aligned along a payline, then the winning combination can also be won if a wild symbol is selected instead of one or more of the cherry symbols. Thus, the three-cherry winning combination can be won by any combination of three symbols selected from the group of cherry and wild symbols that land along an active payline.

In one type of existing games, one of a plurality of displayed symbols is designated as a wild symbol after the completion of each game. For example, after a player spins a plurality of reels an outcome displays an arrangement of symbols consisting of a first symbol, a second symbol, and a third symbol. Then, in a secondary display, the second symbol is designated as a wild symbol after the outcome has been displayed. A problem with this type of games is that the player does not know the location in which the wild symbol will be located, and, consequently, the player is not encouraged to anticipate a wild symbol in a known location. A related problem with this type of games is that it makes it too difficult for the player to visually anticipate all the winning combinations based on a wild symbol. Because the location of the wild symbol is not clearly distinguishable, the player is forced to mentally search the displayed symbols for the designated wild symbols to determine which combinations are winning combinations. Making a game more difficult results in a less pleasurable gaming experience for the player.

In another type of existing games, a bonus symbol is designated as a wild symbol for a plurality of spins during a bonus game of a reel game. After spinning the reels, the bonus symbol remains fixed in the same location only after the bonus symbol has landed in that location and only for a limited number of spins. One problem with this type of games is that the player is uncertain whether the bonus symbol will ever be selected. Thus, the player does not necessarily anticipate a winning combination based on a wild symbol because it is not guaranteed that any of the selected symbols will be wild symbols. Another problem with this type of games is that the bonus symbol remains fixed only for a limited number of spins. For example, the bonus symbol will remain fixed only for the remainder of a predetermined number of free spins awarded after a bonus game has been awarded.

Thus, there is a need to overcome the problems associated with gaming machines using wild symbols. The present invention is directed to satisfying this and other needs.

SUMMARY OF THE INVENTION

A method of conducting a wagering game includes randomly selecting at least one outcome from a plurality of outcomes in response to receiving a wager from a player. The outcome is displayed in the form of an array of symbols and a special symbol is presented in a fixed location within the array of symbols. The special symbol is independent of the array of symbols and is combinable with the symbols of the plurality of reels to indicate the at least one outcome.

In another aspect of the present invention, a method of conducting a wagering game on a gaming terminal includes accepting a wager input for the wagering game. At least one outcome is selected from a plurality of outcomes in response to the wager input. The method also includes the moving, through a display area, and stopping of a plurality of reels having symbols that indicate the at least one outcome. A special symbol is presented in a fixed location of the symbols, within the display area. The special symbol is unaffected by the moving of the plurality of reels and is combinable with the symbols of the plurality of reels to indicate the at least one outcome.

In an alternative aspect of the present invention, a gaming terminal for playing a wagering game includes a display that is coupled to a controller. The controller is programmed to present on the display at least one randomly-selected outcome of a plurality of outcomes in the form of an arrangement of symbols. The controller is further programmed to present at least one special symbol in a fixed position on the display and superimposed with at least one symbol of the arrangement of symbols. The special symbol is independent of the arrangement of symbols.

The above summary of the present invention is not intended to represent each embodiment, or every aspect, of the present invention. Additional features and benefits of the present invention are apparent from the detailed description, figures, and claims set forth below.

Figure 1:
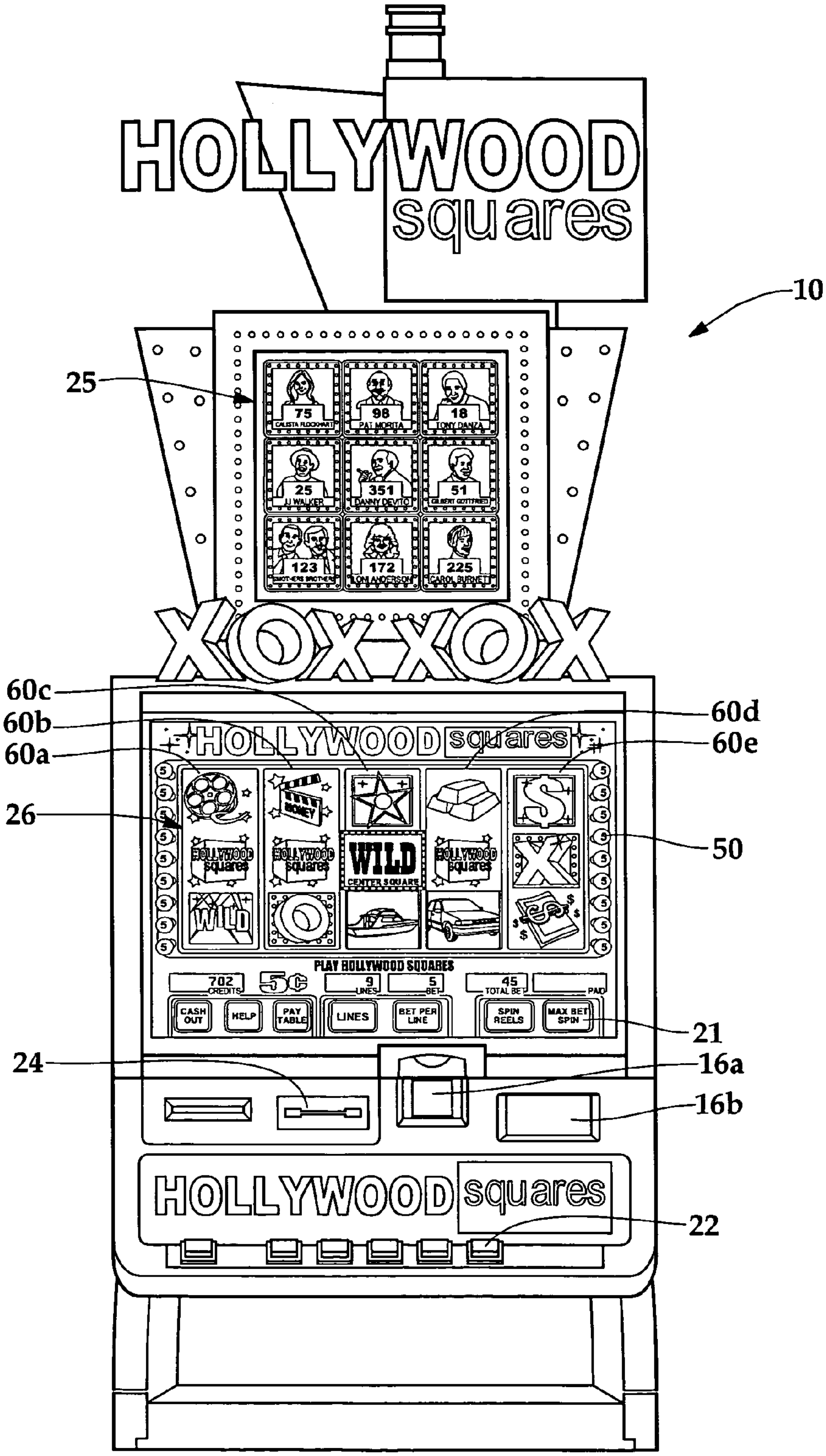
FIG. 1 illustrates a gaming terminal that is useful for displaying a wild-card feature in accordance with the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring to FIG. 1, a gaming terminal 10 is used in gaming establishments such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc.

The gaming terminal 10 includes input devices, such as a wager acceptor 16*a*, 16*b*, a touch screen 21, a push-button panel 22, and a player-identification card reader 24. For output, the gaming terminal 10 includes a main display 26 for displaying information about the basic wagering game. The main display 26 can also display information about a bonus wagering game and a progressive wagering game. The gaming terminal 10 also includes a secondary game display 25 for displaying the bonus wagering game, or for displaying award amounts of a progressive game. While these typical components found in the gaming terminal 10 are described below, it should be understood that numerous other elements may exist and may be used in any number of combinations to create various forms of a gaming terminal.

The wager acceptor 16*a*, 16*b* may be provided in many forms, individually or in combination. The wager acceptor 16*a*, 16*b* may include a coin slot acceptor 16*a* or a bill validator 16*b* to input value to the gaming terminal 10. Or, the wager acceptor 16*a*, 16*b* may include a card-reading device for reading a card that has a recorded monetary value with which it is associated. The card may also authorize access to a central account, which can transfer money to the gaming terminal 10.

A payout mechanism 23 performs the reverse functions of the wager acceptor 16. For example, the payout mechanism 23 may include a coin dispenser or a note dispenser to output value from the gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 can also display the bonus game associated with the basic wagering game. The main display 26 may take the form of a cathode ray tube (CRT), a high resolution LCD, a plasma display, a LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome.

The player-identification card reader 24 allows for the identification of a player by reading a card with information indicating his or her true identity. Currently, the identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10.

A player begins play of the basic wagering game by inserting a wager input into the wager input accepter 16*a*, 16*b* of the gaming terminal 10. A player can select play by either using the touch screen 21 or the push-button panel 22. The basic game consists of a plurality of symbols on reels 60*a*–60*e* (commonly referenced as reels 60) that are displayed along a plurality of paylines 50, yielding a plurality of outcomes of the basic game. Such outcomes are randomly selected in response to the wagering input by the player. One of the plurality of randomly-selected outcomes is a start-bonus outcome, which can include any variations of symbols or symbol combinations triggering a bonus game.

Figure 2:
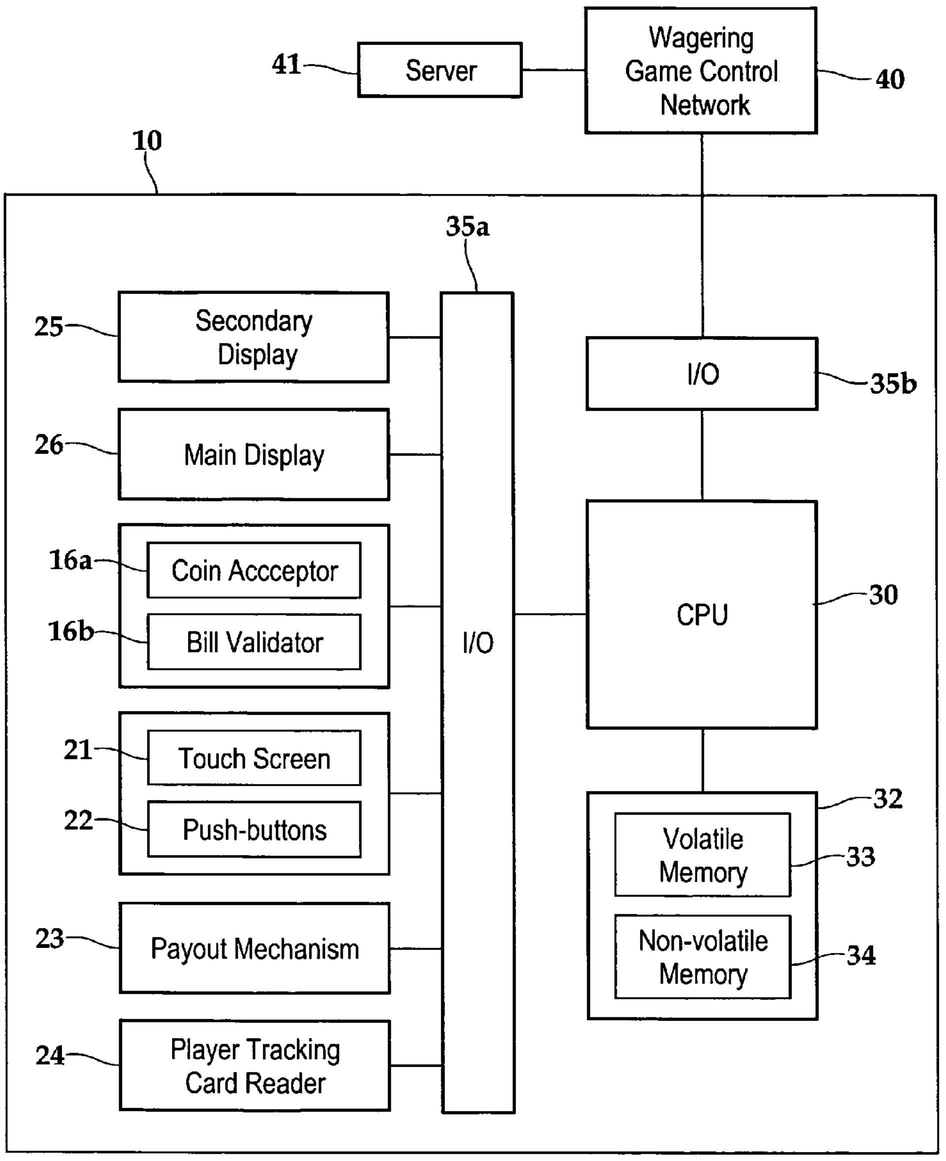
FIG. 2 illustrates a control system that is used in conjunction with the gaming terminal of FIG. 1.

As shown in FIG. 2, the various components of the gaming terminal 10 are controlled by a central processing unit (CPU) 30, also referred to as a processor (such as a microprocessor or microcontroller). To provide the gaming functions, the CPU 30 executes one or more game programs. The CPU 30 performs the random selection of an outcome from the plurality of outcomes of the wagering game. Alternatively, the random selection of an outcome may be performed remotely by a CPU that is networked to the gaming terminal 10 but is not a component of the gaming terminal 10. The CPU 30 is also coupled to or includes a system memory 32. The system memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*.

Although the I/O circuits 35 may be shown as a single block, it should be appreciated that the I/O circuits 35 may include a number of different types of I/O circuits.

The gaming terminal 10 is typically operated as part of a game control network 40 having control circuitry and memory devices. The gaming terminal 10 often has multiple serial ports, each port dedicated to providing data to a specific host computer system that performs a specific function (e.g., accounting system, player-tracking system, progressive game control system, etc). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40.

Figure 3:
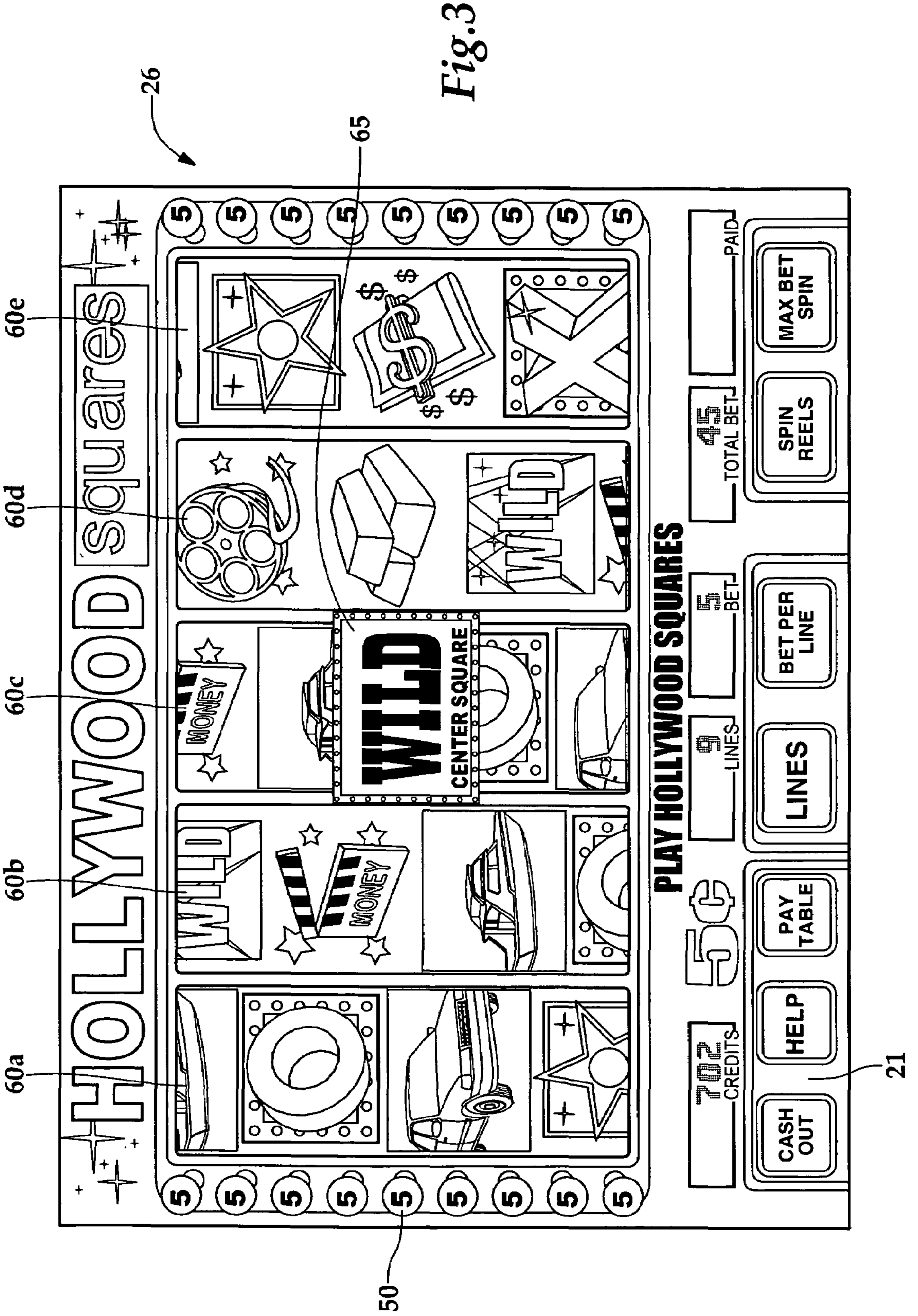
FIG. 3 illustrates a basic game screen showing a plurality of reels while they are spinning.

Referring now to FIG. 3, the main display 26 includes a special symbol 65, which is fixed in a central location, and the reels 60, which are shown in a spinning mode. The special symbol 65 is a wildcard symbol and it is fixed along the payline 50, on the central reel 60*c*. Also known as a wild symbol or a wild center square, the special symbol 65 overlaps a middle symbol position of the central reel 60*c*, being superimposed over the central reel 60*c*. The special symbol 65 includes a foreground portion and a background portion. The foreground portion includes the letters “WILD,” for indicating to a player the function of the special symbol 65, e.g., that the symbol location occupied by the special symbol 65 is a wild location. The background portion includes a border for enhancing a player’s visual awareness of the location of the special symbol 65. The background and the foreground portion of the special symbol 65 are selected to correspond to the theme of the gaming terminal 10. For example, the special symbol 65 can be selected to correspond to a gaming theme based on the popular television game show “Hollywood Squares.”

The special symbol 65 is independent of the five reels 60*a–e*, meaning that the spinning of the reels 60*a–e* does not affect the special symbol 65. The special symbol 65 remains fixed at the same location on the main display 26 regardless of whether the reels 60*a–e* are moving or stopped. Although the special symbol 65 is shown to be a wild symbol, the special symbol 65 can be any symbol. For example, the special symbol 65 can be any symbol that appears on any of the reels 60, it can be a scatter symbol, it can be a bonus-triggering symbol, etc. If the special symbol 65 is on an active payline, then the special symbol 65 is combinable with at least one of the other symbols that land along the payline to display the game outcome to the player.

The special symbol 65 is preferably at least slightly transparent (or translucent) to make the symbol on reel 60*c* that it overlaps at least somewhat visible. Optionally, the special symbol 65 is opaque. For example, the special symbol 65 can be a physical plate that is attached to the main display 26 in the central location. Alternatively, the special symbol 65 is a video simulation showing an animation every time a winning outcome including the special symbol 65 has been selected. The border on the background portion of the special symbol 65 can include a plurality of trace lights, which can change color when a winning outcome has been selected. For example, if the lights are white or yellow in normal mode, the lights can change to a color, e.g., green, that matches the background of the neighboring symbols when a winning combination is displayed. Alternatively, the lights can twinkle and/or can animate when a predetermined outcome has been selected.

If the theme of the game is based on “Hollywood Squares,” the symbols on reels 60 can be selected from a group consisting of a Hollywood Square symbol, an X symbol, an O symbol, a Wild symbol, a Private Jet symbol, a Yacht symbol, a Luxury Car symbol, a Gold Bars symbol, a Money symbol, a Dollar Sign symbol, a Film Reel symbol, and a Movie Slate symbol. Each one the symbols can include animations when the particular symbol lands on an active payline.

While the reels 60 are spinning, as shown, the player is generally inclined to root for identical symbols to land on either side of the wild symbol 65, along the payline 50. Thus, having the wild symbol 65 present in a fixed location increases the player’s perception that her or she is close to selecting a winning outcome.

Figure 4:
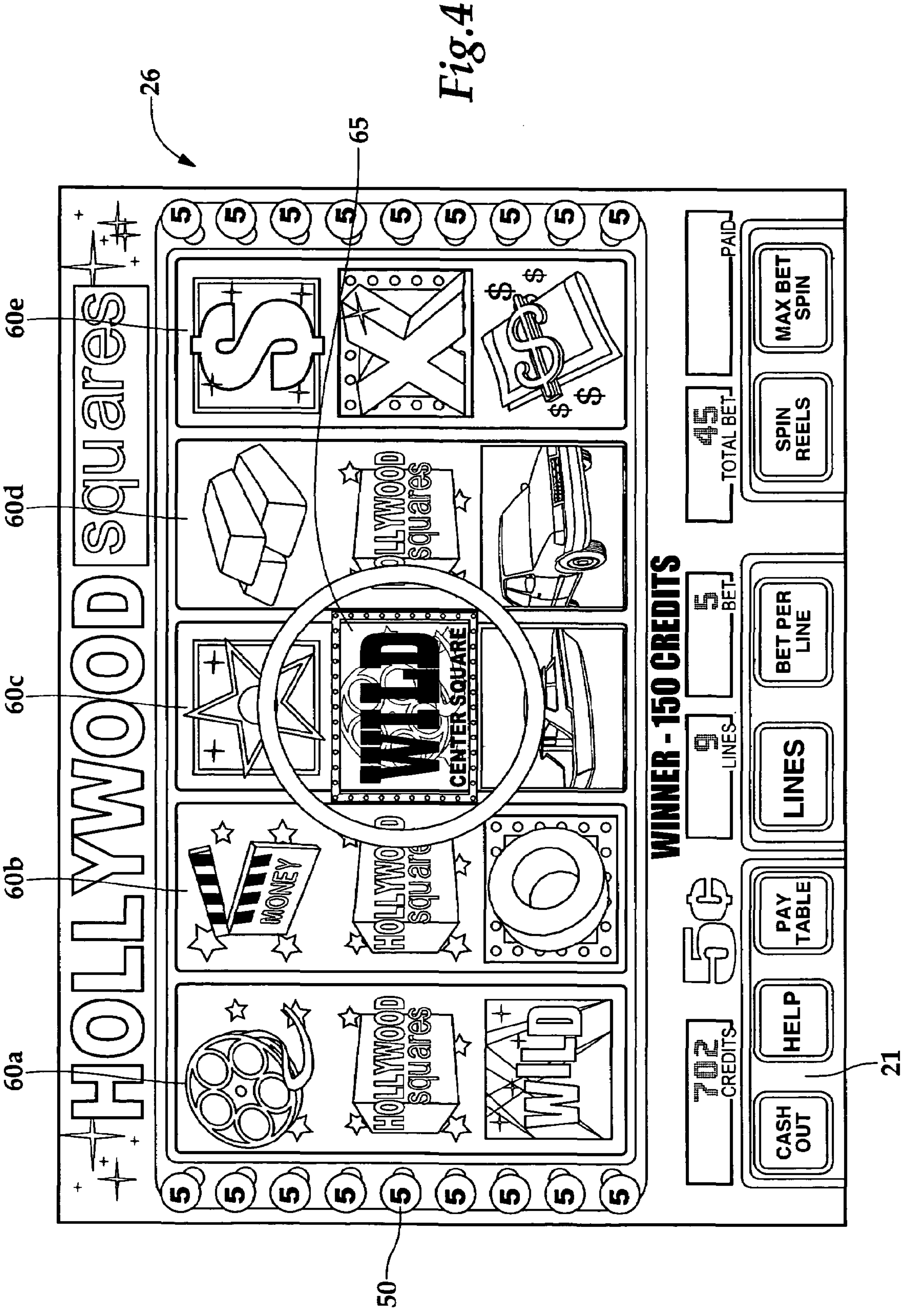
FIG. 4 illustrates the basic game screen of FIG. 3 showing the plurality of reels after being stopped.

In FIG. 4, the spinning reels 60 have stopped moving and a predetermined outcome has been selected. The wild symbol 65 is now along the payline 50 with three Hollywood Square symbols and an X symbol. If a winning outcome consists of having four consecutive Hollywood Square symbols, then, because the wild symbol 65 is substituted for a Hollywood Square symbol, a winning outcome has been selected.

In alternative embodiments, the position of the special symbol 65 is located anywhere on the main display 26 and/or is located in more than one position. If the special symbol 65 is located over more than on symbol position, the positions can be adjacent or separate. Alternatively, the location of the special symbol 65 can change from game to game, either in response to the player’s input and/or in response to predetermined conditions. The special symbol 65 can be displayed during a base game and/or during a bonus game.

Figure 5:
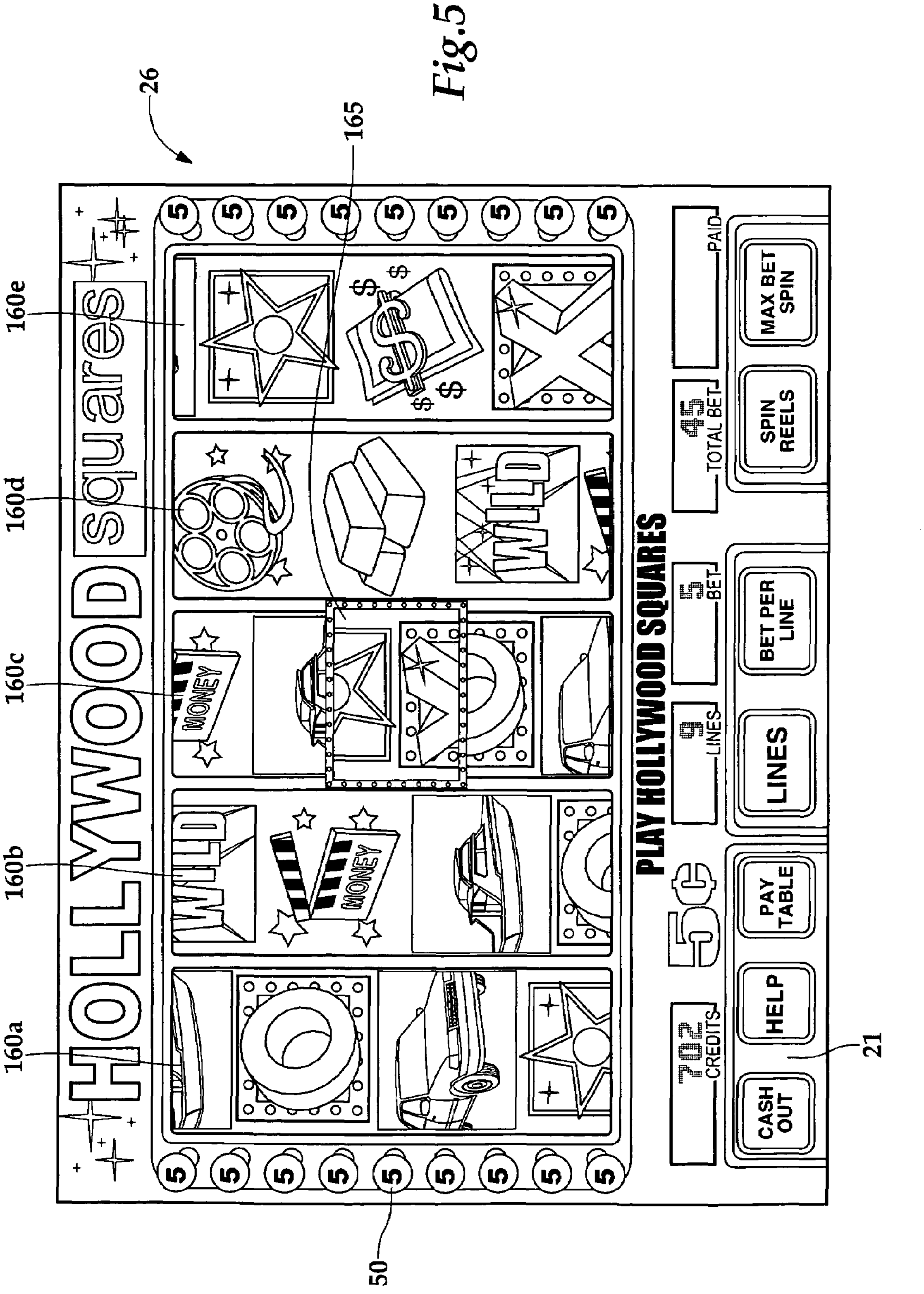
FIG. 5 illustrates a basic game screen showing an independent reel included in a plurality of reels in accordance with another embodiment of the present invention.

Referring now to FIG. 5, in another embodiment a special symbol 165 is an independent reel that is superimposed over the central reel 160*c*. The independent reel is a distinct reel that displays a special symbol 165 according to its own math table. The independent reel can display any symbol at any time. Preferably, the independent reel is spinned and stopped before the other reels 160 have stopped. The independent reel can be spinned and stopped by the player or it can be spinned and stopped automatically, in response to receiving a wager from the player. As such, although there is a fixed location for the special symbol 165, the type of special symbol within the fixed location can change based on the spinning reel.

Figure 6:
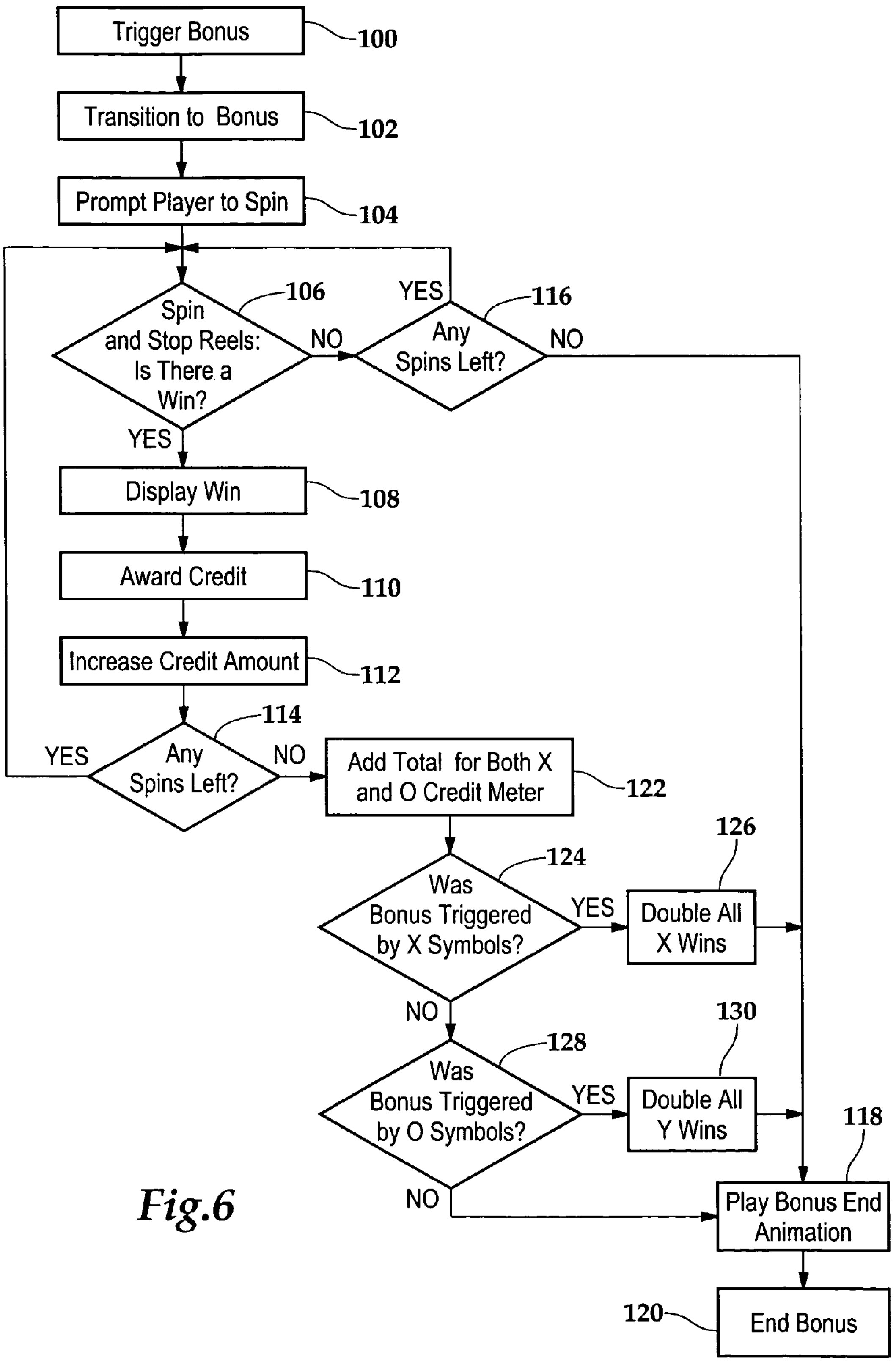
FIG. 6 illustrates a flow chart depicting a bonus game in accordance with another embodiment of the present invention.

Referring now to FIGS. 6–12, a “Mystery Star Tic-Tac-Toe” bonus game will be described. Initially, referring to FIG. 6, the general method for playing the bonus game will be described, and then, referring to FIGS. 7–12, a detailed example will be described. Referring to FIG. 6, a flowchart will be used to describe the bonus game. At step 100 the bonus game is triggered when three or more X or O symbols appear scattered on the reels 60. At step 102 the screen displayed on the main display 26 transitions to an eight-way grid of X and O symbols. Nine “Bobble Head Celebrities” are highlighted in a screen on the secondary display 25 and random credit amounts are displayed in a LED meter located below each Celebrity. The player is credited with a predetermined number of free spins, e.g., nine spins. At step 104 a Show Host message is played and the player is prompted to press a Spin button.

At step 106 the reels are spinned and stopped. If there is a win, then, at step 108 the win is displayed. The corresponding “Bobble Head Celebrities” are lit and bounced, and a speech for the highest winning Celebrity is played. At step 110 the credit amount is awarded for the corresponding Celebrity in a corresponding X or O meter, depending if it is a win based on three O symbols or three X symbols. At step 112 the credit amout is increased for the winning locations. If there are spins left, then at step 114 the player is taken back to step 106 for spinning the reels 60.

If at step 106 the resulting outcome is not a win, then at step 116 a determination is made if there are any spins left. If there are spins left, the player is prompted to spin again, at step 106. If at step 116 there are no spins left, then at step 118 an End-Bonus animation is played and the bonus game ends at step 120.

If at step 114 there are no spins left, and the player has had at least one win, at step 122 the total is added for both the X and the O credit meters. If a determination is made at step 124 that the bonus was triggered by the X symbols, then at step 126 all the X wins are doubled. If a determination is made at step 128 that the bonus was triggered by the O symbols, then at step 130 all the O wins are doubled. If the bonus was not triggered by X symbols or O symbols, then none of the wins are doubled. The End-Bonus animation is played, at step 118, and the bonus game ends at step 120.

Figure 7:
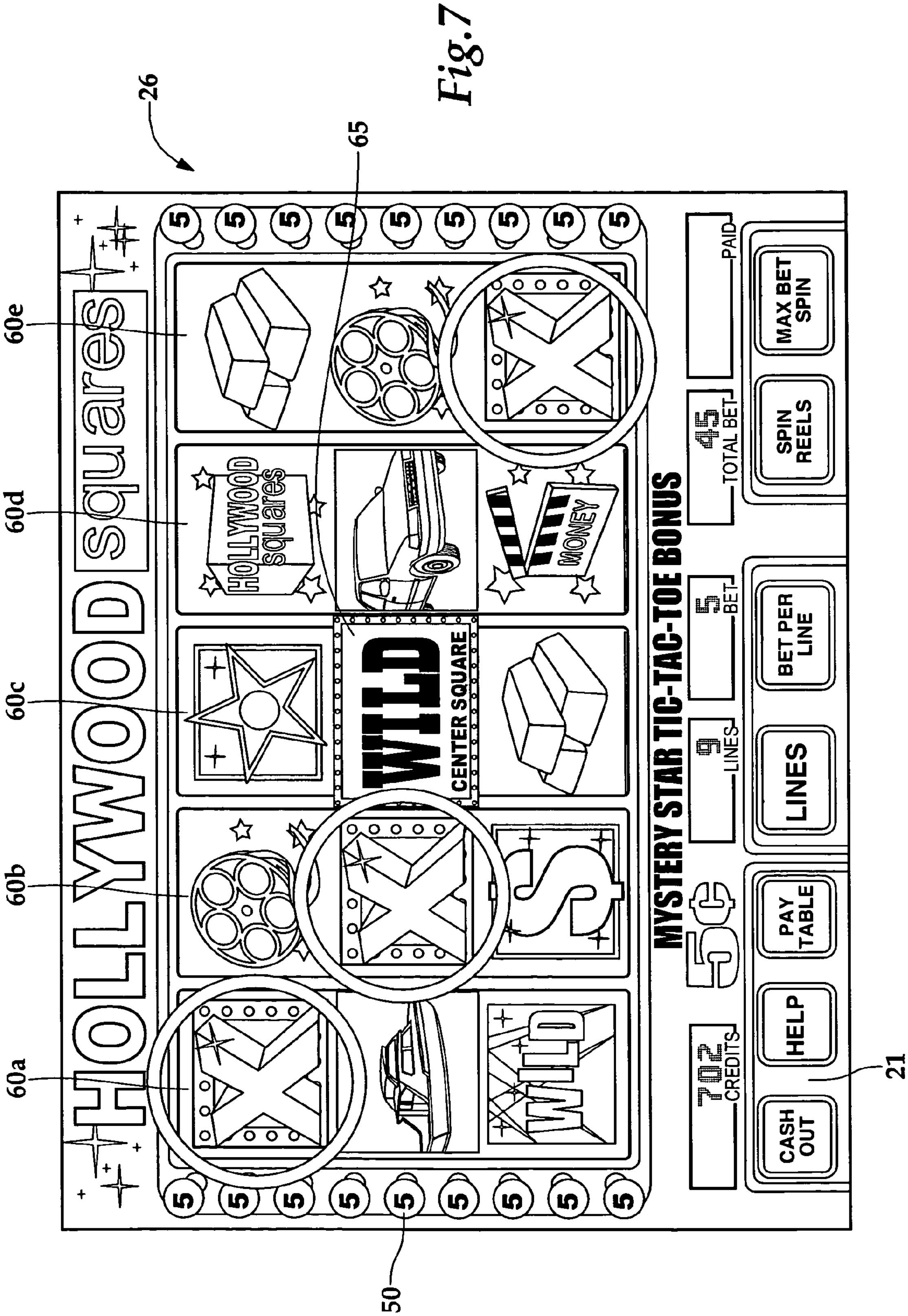
FIG. 7 illustrates a basic game screen showing the triggering of a bonus game in accordance with another embodiment of the present invention.
Figure 8A:
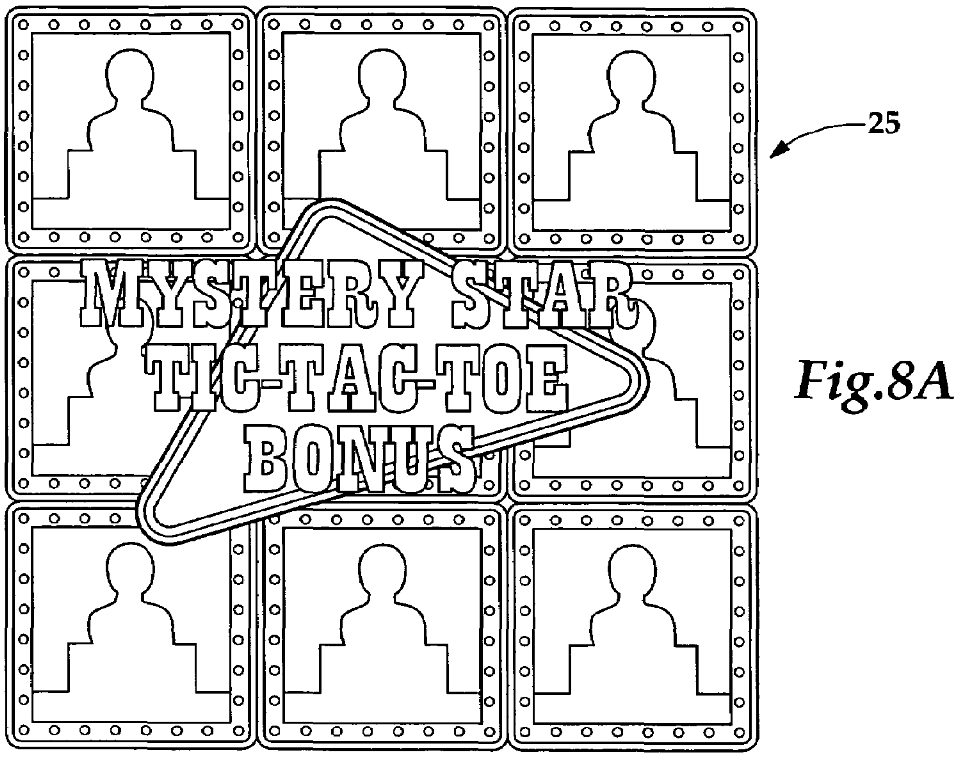
FIG. 8*a* illustrates a top display showing a first screen of a bonus game in accordance with another embodiment of the present invention.
Figure 8B:
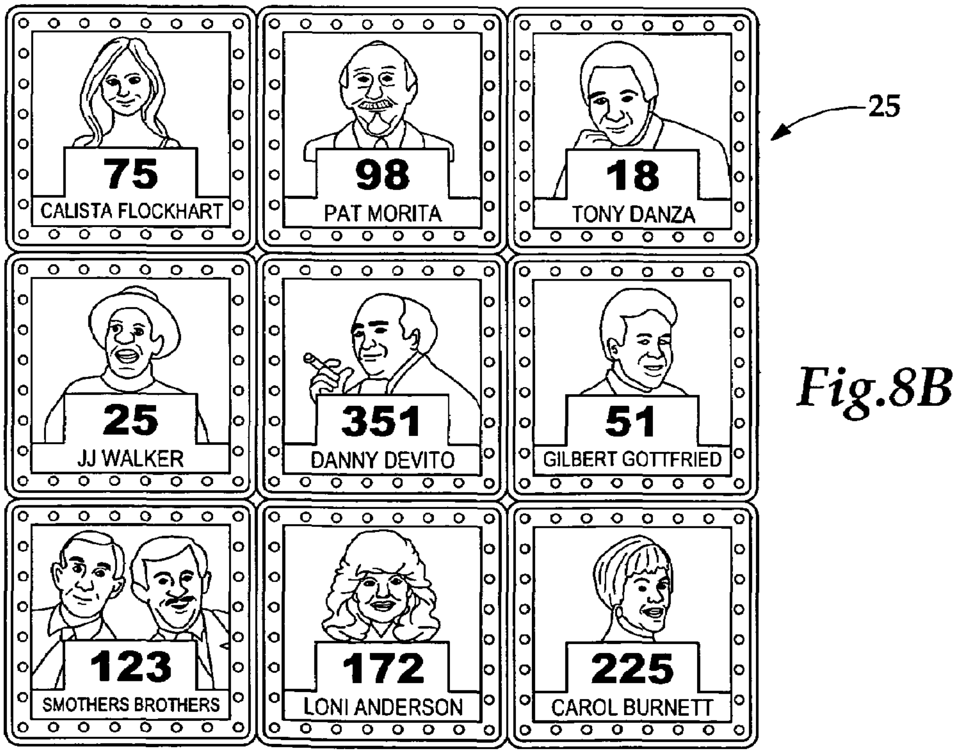
FIG. 8*b* illustrates the top display of FIG. 8*a* showing a second screen of the bonus game.

Referring now to FIGS. 7–12, an example of the bonus game will be described. In FIG. 7, the bonus game is triggered by three scattered X symbols. When the bonus game starts, a top screen (FIG. 8*a*) displayed in the secondary display 25 shows a Hollywood Squares board with nine mystery guest stars. In FIG. 8*b*, each square quickly changes to show the mystery guest star and the credit amount corresponding to each star. Specifically, the mystery guest and the corresponding credit amounts are as follows, starting at the top left corner and going from left to right: Calista Flockhart (75 credits), Pat Morita (98 credits), Tony Danza (18 credits), J. J. Walker (25 credits), Danny Devito (351 credits), Gilbert Gottfreid (51 credits), The Smothers Brothers (123 credits), Loni Anderson (172 credits), and Carol Burnett (225 credits).

Figure 9:
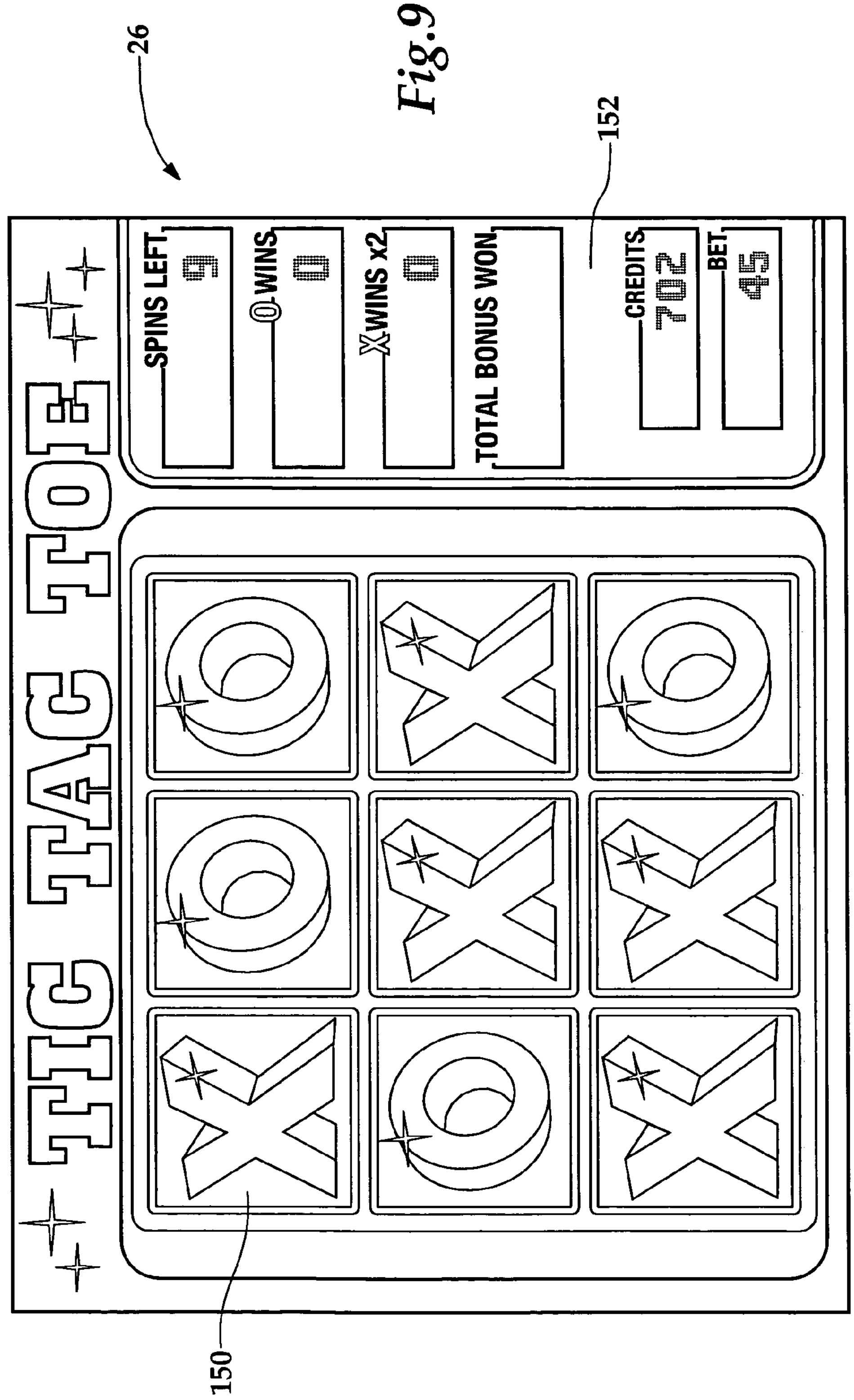
FIG. 9 illustrates a first screen of a bottom display of the bonus game of FIG. 8*a*.

In FIG. 9, the main display 26 displayes a Tic-Tac-Toe board 150 having nine reels of X symbols and O symbols. Thus, each symbol location includes its own independent reel, i.e., each reel has its own math table. The player is awarded nine free spins of Tic-Tac-Toe. A menu 152 located to the right of the board displays the number of spins left, the number of O symbol wins, the number of X symbol wins, the total bonus won, the total number of the player's credits, and the amount of the bet.

Figure 10A:
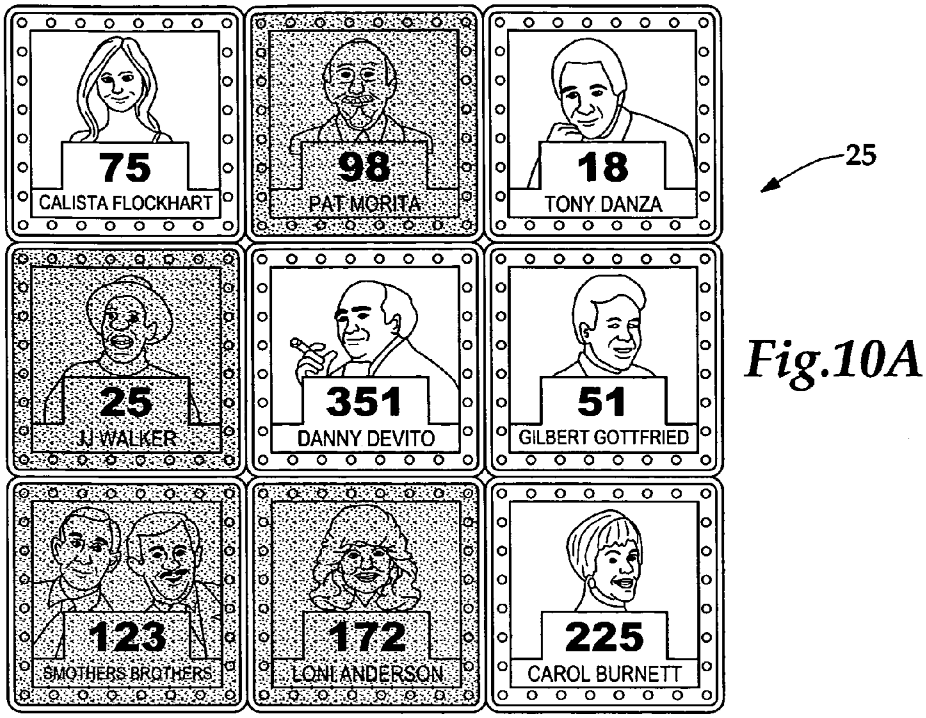
FIG. 10*a* illustrates on the top display of FIG. 8*a* the result of a spin.
Figure 10B:
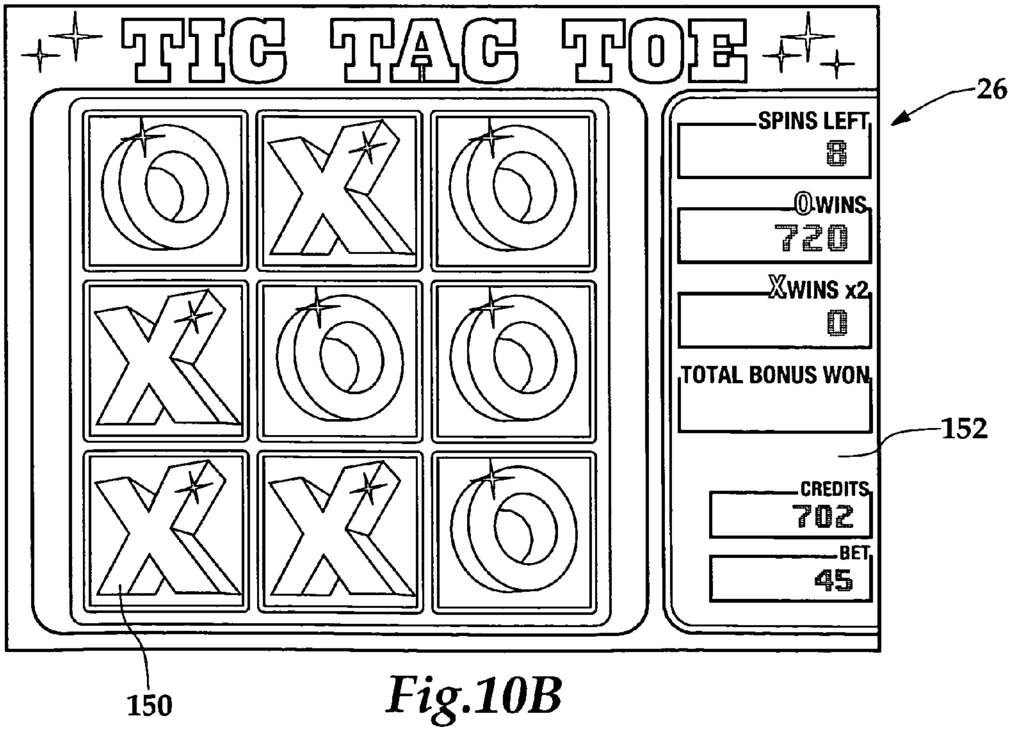
FIG. 10*b* illustrates on the bottom display of FIG. 9 the result of the spin of FIG. 10*a*.

In FIGS. 10*a*–*b*, the player has spinned the reels and a Tic-Tac-Toe combination has been selected. When the player gets the Tic-Tac-Toe combination on the reels, the secondary display 25 lights up the Celebrity Stars corresponding to corresponding Tic-Tac-Toe positions. For example, in FIG. 10*b* two winning combinations have been selected: an O symbol winning combination in a vertical line on the right side of the board 150, and an O symbol winning combination in a diagonal line starting with an O symbol at the top left corner of the board 150. Consequently, FIG. 10*a* shows the corresponding Celebrity Stars light up in the secondary display 25: Tony Danza, Gilbert Gottfreid, and Carol Burnett for the first winning combination, and Calista Flockhart, Danny Devito, and Carol Burnett for the second winning combination. The player is awarded all of the credit values for each of the highlighted Celebrity Stars. The menu 152 shows the total number of O symbol wins being 720 credits (which equals the amount of credits that corresponds to the highlighted Celebrity Star: 18+51+225+75+351).

Figure 11A:
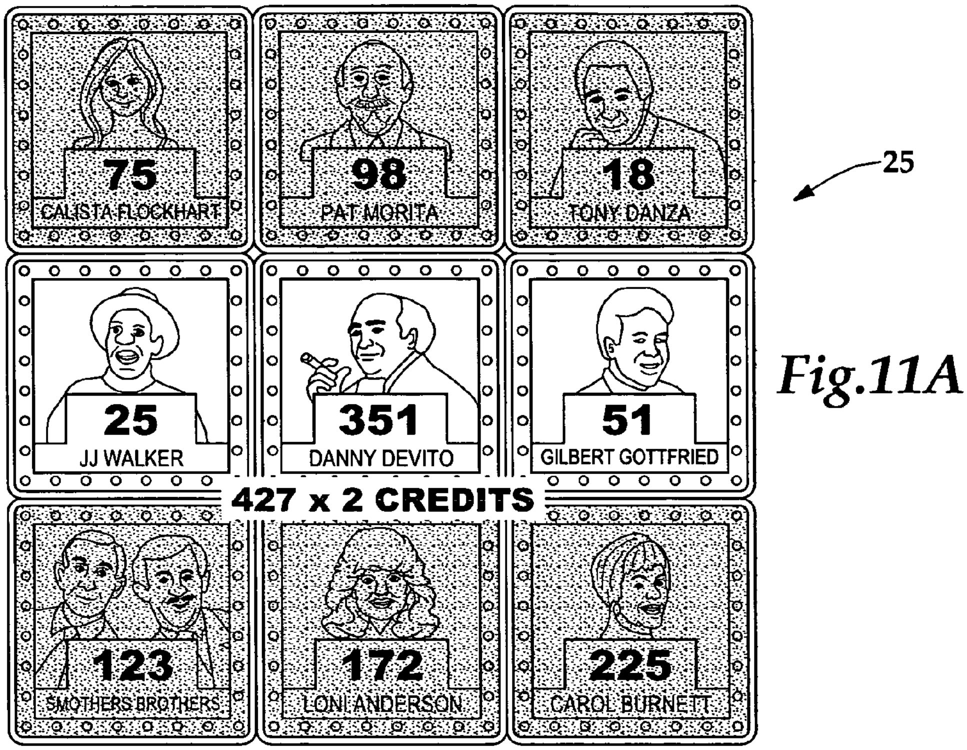
FIG. 11*a* illustrates on the top display of FIG. 8*a* the result of another spin.
Figure 11B:
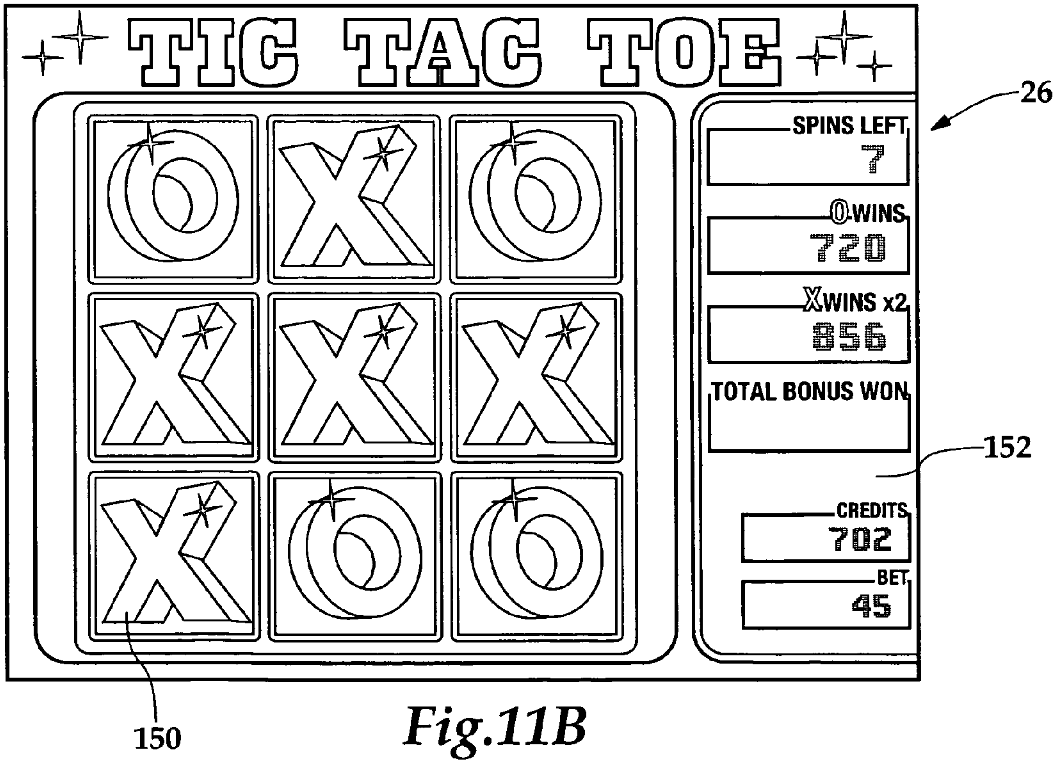
FIG. 11*b* illustrates on the bottom display of FIG. 9 the result of the spin of FIG. 11*a*.
Figure 12:
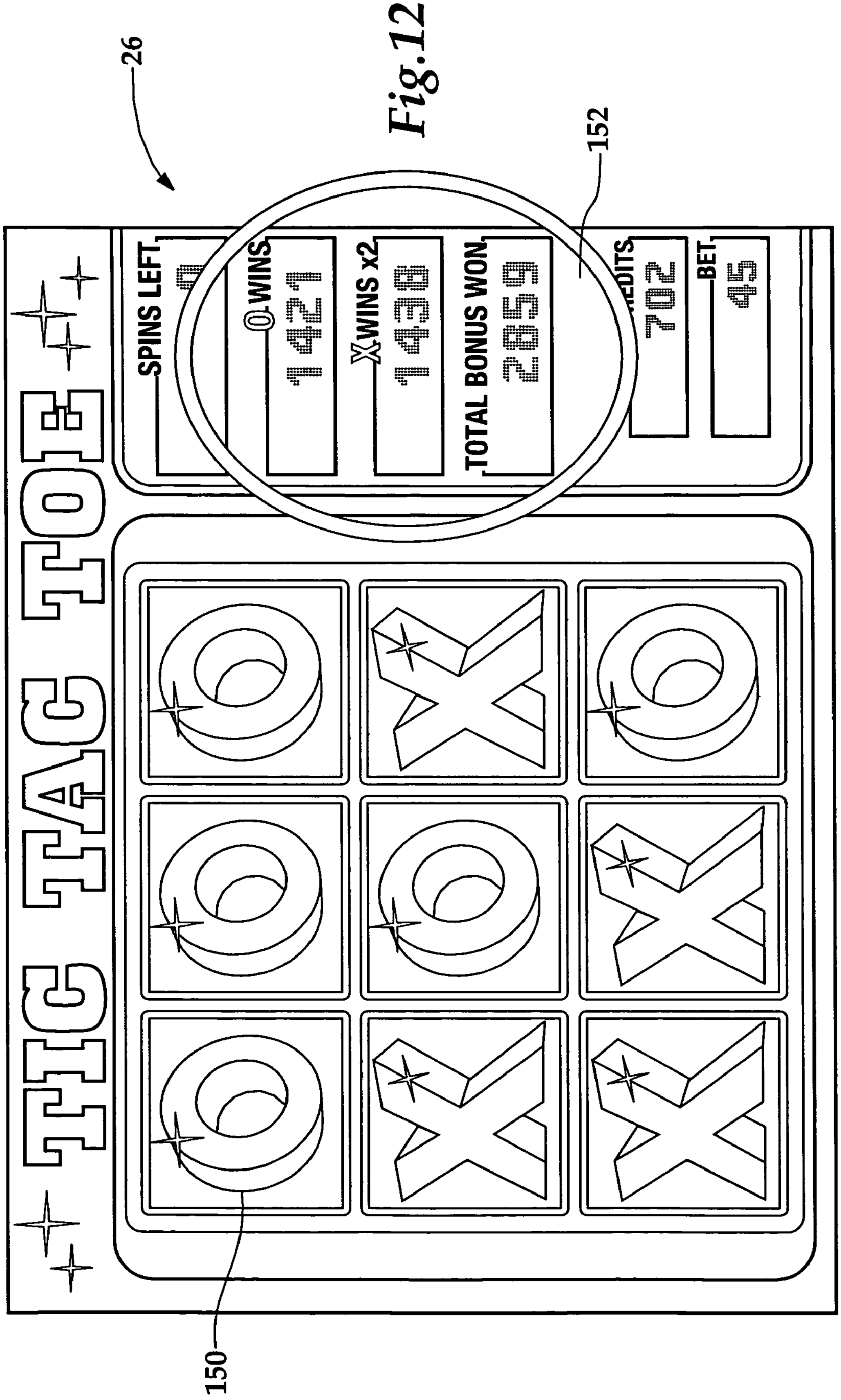
FIG. 12 illustrates the awarding of winnings based on the results achieved in FIGS. 10*a*–11*b*.

In FIGS. 11*a*–*b*, the player has spinned the reels again and another Tic-Tac-Toe combination has been selected. The winning combination is an X symbol win that is a horizontal line in the center of the board 150. The corresponding Celebrity Stars, J. J. Walker, Danny Devito, and Gilbert Gottfreid, are highlighted and the credits are added to show a total of 427 credits (25+351+51). Because this has been an X symbol win, wherein the bonus game has been triggered by three X symbols, the total winnings for this outcome is doubled. Thus, the total number of credits won during this spin is 856 credits (427×2).

After all nine spins are completed, both credit amounts are added together and the player is awarded both bonus values. Thus, in FIG. 12 the O wins and the X wins are added to show a total bonus, e.g., 2,859 credits. After the End-Bonus animation is played, the bonus game returns to the basic game.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A method of conducting a wagering game, comprising:

randomly selecting at least one game outcome from a plurality of game outcomes in response to receiving a wager from a player;

displaying said game outcome in the form of an array of symbols on a plurality of spinning reels, said array of symbols directly indicating said game outcome when the plurality of spinning reels have stopped spinning; and presenting a special symbol in a fixed location along an active payline within said array of symbols, said active payline being activated in response to receiving said wager from said player, said special symbol being independent of said array of symbols and being combinable with said symbols of said plurality of reels to directly indicate said at least one game outcome; and awarding an award if a winning combination is directly displayed along said active payline by the combination of said special symbol and one or more of said array of symbols.

2. The method of claim 1, wherein said presenting step is performed after said selecting step.

3. The method of claim 1, wherein said presenting includes displaying said special symbol as a wild symbol.

4. The method of claim 1, wherein said presenting includes displaying said special symbol in a center location of said array of symbols.

5. The method of claim 1, wherein said presenting includes displaying said special symbol superimposed over at least one symbol of said array of symbols.

6. The method of claim 5, wherein said presenting further includes displaying said special symbol having a transparent background to allow at least a portion of an underlying symbol of said array of symbols to be seen.

7. The method of claim 1, wherein said presenting includes displaying a graphical element for said special symbol.

8. The method of claim 7, wherein said presenting further includes changing said graphical element to match an element of a symbol of said array of symbols when said special symbol and said symbol are both part of a winning payline.

9. The method of claim 7, wherein said presenting further includes displaying said graphical element as a plurality of trace lights surrounding said special symbol.

10. The method of claim 9, wherein said presenting further includes changing a color of said trace lights to match a color of a border of a symbol of said array of symbols when said special symbol and said symbol are both part of a winning payline.

11. The method of claim 1, wherein said presenting includes displaying said special symbol in an independent reel.

12. The method of claim 11, wherein said presenting further includes displaying said independent reel superimposed over at least one symbol of said array of symbols.

13. The method of claim 11, wherein said presenting further includes displaying said independent reel having a transparent background to allow at least a portion of an underlying symbol of said array of symbols to be seen.

14. The method of claim 11, wherein said presenting further includes replacing at least one symbol of said array of symbols with said independent reel.

15. The method of claim 11, wherein said presenting further includes displaying said independent reel in a center location of said array of symbols.

16. The method of claim 1, wherein said presenting includes displaying said special symbol in at least two fixed locations of said array of symbols.

17. The method of claim 1, wherein said presenting includes displaying said special symbol in a video form.

18. The method of claim 1, wherein said presenting includes displaying said special symbol in a mechanical form.

19. A method of conducting a wagering game on a gaming terminal, comprising:

accepting a wager input for a wagering game;

randomly selecting at least one game outcome for said wagering game in response to said wager input, said at least one game outcome selected from a plurality of game outcomes;

spinning, through a display area, a plurality of spinning reels having symbols that directly indicate said at least one game outcome;

stopping the spinning of said plurality of reels to indicate said at least one game outcome via said symbols;

presenting a special symbol in a fixed location along an active payline within said display area, said active payline being activated in response to receiving said wager, said special symbol being unaffected by said spinning of said plurality of reels and being combinable with said symbols of said plurality of reels to directly indicate said at least one game outcome; and awarding an award if a winning combination is directly displayed along said active payline by the combination of said special symbol and one or more of said symbols.

20. The method of claim 19, wherein said presenting includes displaying said special symbol as a wild symbol.

21. The method of claim 19, wherein said presenting further includes displaying said special symbol having a transparent background to allow at least a portion of an underlying symbol of said array of symbols to be seen.

22. The method of claim 19, wherein said presenting includes displaying said special symbol in an independent reel.

23. The method of claim 22, wherein said displaying includes replacing one of said symbols with said independent reel.

24. The method of claim 22, wherein said displaying includes superimposing said independent reel on at least one of said symbols.

25. The method of claim 19, further providing said presenting step before said stopping step.

26. The method of claim 19, wherein said presenting includes displaying said special symbol in a stationary mode.

27. A gaming terminal for playing a wagering game, comprising:

a display; and a controller coupled to said display and programmed to present on said display at least one randomly-selected game outcome of a plurality of game outcomes in the form of an arrangement of symbols, said arrangement of symbols directly indicating said at least one randomly-selected game outcome, and present at least one special symbol in a fixed position along an active payline on said display superimposed with at least one symbol of said arrangement of symbols, said active payline being activated in response to receiving a wager from a player, said special symbol being independent of said arrangement of symbols and being combinable with said arrangement of symbols to directly indicate said at least one randomly-selected game outcome, and award an award if a winning combination is directly displayed along said active payline by the combination of said special symbol and one or more symbols of said arrangement of symbols.

28. The gaming terminal of claim 27, wherein said special symbol is a wild symbol.

29. The gaming terminal of claim 27, wherein said fixed position is a central position.

30. The gaming terminal of claim 27, wherein said special symbol is at least in part transparent.

31. The gaming terminal of claim 27, further comprising an independent reel coupled to said controller for displaying said special symbol, said fixed position being located on said independent reel.

32. The gaming terminal of claim 31, wherein said independent reel is at least partially transparent.

33. The gaming terminal of claim 27, wherein said display is a video display.

34. The gaming terminal of claim 27, wherein said display is a mechanical display.

35. The gaming terminal of claim 27, wherein said arrangement of symbols is displayed on a plurality of reels.

36. The gaming terminal of claim 27, wherein said special symbol is a stationary symbol.

* * * * *